United States Patent

Bier

[15] 3,673,841
[45] July 4, 1972

[54] SCREWDOWN DEVICES FOR ROLLING MILLS

[72] Inventor: Albert Bier, St. Ingbert-Saar, Germany

[73] Assignee: Moeller & Neumann GmbH, St. Ingbert-Saar, Germany

[22] Filed: Aug. 28, 1969

[21] Appl. No.: 855,460

[52] U.S. Cl. ............................................................72/248
[51] Int. Cl. ....................................................B21b 31/24
[58] Field of Search ..............................................72/248, 21

[56] References Cited

UNITED STATES PATENTS 1,734,793   11/1929   Brüninghaus.............................72/248
3,132,547   5/1964   Doyle et al..................................72/21

Primary Examiner—Charles W. Lanham
Assistant Examiner—R. M. Rogers
Attorney—Arthur Schwartz

[57] ABSTRACT

There is disclosed a screwdown device for displacing a chock in a window of a rolling mill frame, wherein two mutually meshing screw members are disposed between a transverse member of the frame and the chock, one of the screw members being non-rotatably secured and the other screw member being rotatable by means of a shaft extending through the transverse member, for the purpose of effecting mutually relative displacement of said screw members and thereby the screwdown movement of the chock.

3 Claims, 2 Drawing Figures

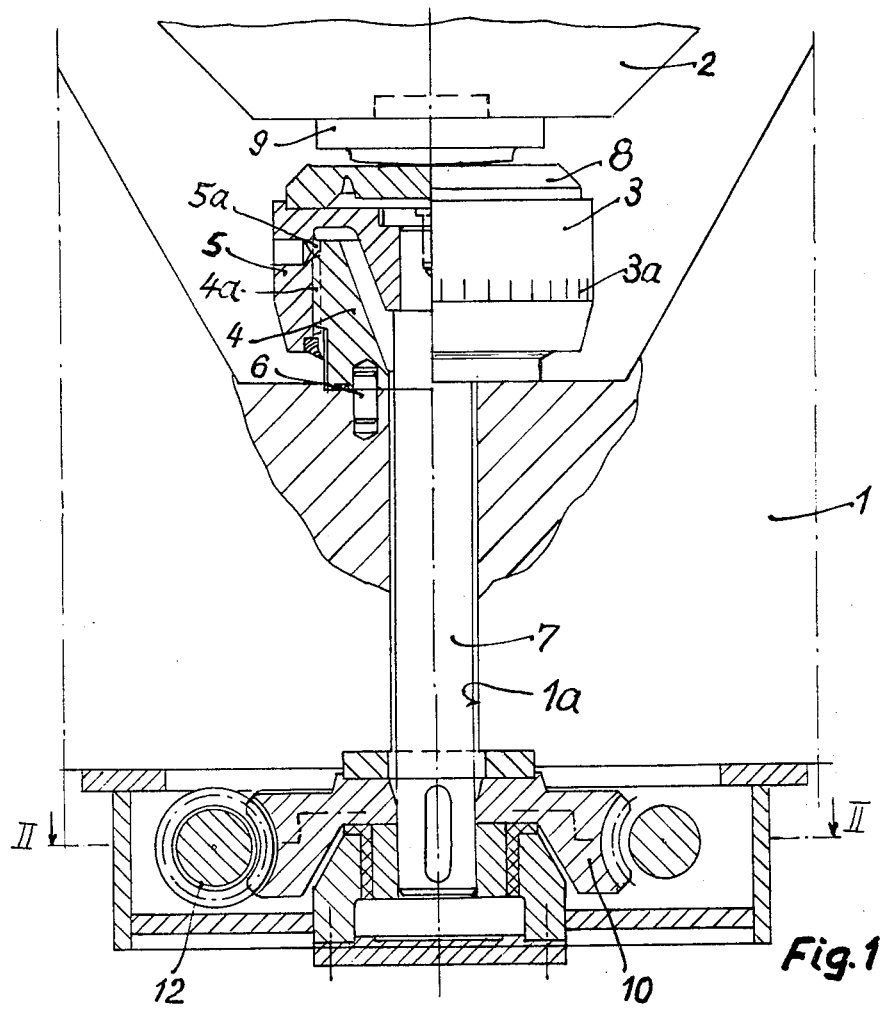
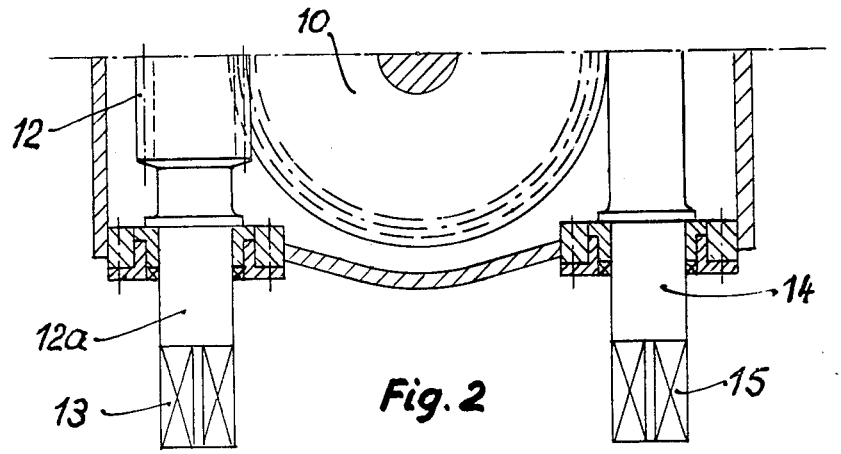
Fig. 1
Fig. 2

SCREWDOWN DEVICES FOR ROLLING MILLS

This invention relates to a screwdown device for displacing a chock in a frame window of a rolling mill frame. Usually this displacement is effected by means of a pressure spindles which extends through a transverse member of the frame and the free end of which affects the chock, under certain circumstances by way of an intermediate cup member. The pressure spindle which may be driven manually or by means of a motor runs in a pressure nut which is fixed in the transverse member of the frame.

Because during a rolling process the pressure spindle of a rolling mill frame must transmit the rolling pressure through the screw connection to the frames, the diameter of the pressure spindles is selected rather large in order to keep the proportion of the resilience of the pressure spindles in the total resilience of the rolling mill as small as possible. However the diameter of the pressure nut becomes large thereby, and thus eventually affects the width of the frame. For this reason in particular the frames of light rolling mills become unnecessarily heavy, unless an accumulation of material is provided at the transverse frame member in the region of the pressure spindle. However such accumulation can be provided only to a limited extent for reasons connected with the casting technique.

Furthermore pressure spindle-screwdown devices have the unfavorable property that the free length of a pressure spindle increases as the width of the rolling gap is decreased. However, the rolling tolerances become smaller as the dimensions of the rolled material decrease, but the proportion of the resilience of the pressure spindle in the total resilience of the frame increases under these circumstances in a pressure spindle-screwdown device. This is another reason why the diameter of the pressure spindles is made as large as possible.

The invention provides a screwdown device for rolling mills which requires only a relatively small opening in a transverse frame member and which nevertheless permits the diameter of pressure transmitting screw-threads to be made very large.

According to the invention the pressure spindle is replaced by a spacer member the length of which is variable and which is disposed between a chock and a transverse frame member and which consists of an inner screw member having an external screw-thread and an outer screw member having an internal screw-thread, of which screw members one member is non-rotatably fixed and the other member is rotatable and is adapted to be driven by means of a shaft which extends through an opening in the transverse frame member. The novel screwdown device may be in the form of a screwdown cup which is directly supported in the transverse frame member; admittedly the magnitude of its elongation increases as the width of the rolling gap is decreased; however, owing to its compact construction and the fact that it is directly supported on the transverse frame member it is inherently considerably stiffer than a long pressure spindle which is supported by the transverse frame member only by the screw-threads within the latter.

Since the chocks of a rolling mill must perform certain rocking movements during rolling, it is preferable that the screw member having the external screw-thread is supported on the transverse frame member and is non-rotatable. To fix such screw member non-rotatably on a chock would be objectionable because this would hinder the facility for removing the chock.

In order that a minimum of friction occurs between the rotatable screw member and the oppositely disposed support surface, it is advisable to provide a pressure bearing between the driven screw member and the constructional member on which the screw member is supported. In the case of small mills, however, it may be sufficient to provide a spherical support surface.

One embodiment of the invention is described below by way of example with reference to the accompanying drawings, in which:

FIG. 1 illustrates a screwdown device disposed between the transverse frame member and the lower chock, one half being shown in a vertical section transverse to the roll axis, and the other half being shown in elevation, and FIG. 2 illustrates one half of a horizontal section along the line II—II in FIG. 1.

FIG. 1 illustrates in section a transverse frame member 1 and a lower chock 2. Between these two members there is located a spacer member of adjustable length, or screwdown cup 3 which consists of an inner screw member 4 having an external screw-thread 4a and a superimposed screw member 5 having an internal screw-thread 5a. The internally disposed screw member 4 is non-rotatably fixed by means of pins 6 relatively to the transverse frame member. For driving the outer screw member 5 there serves a shaft 7 which extends through an opening 1a of the frame window 1. The diameter of this opening is considerably smaller than in a conventional pressure spindle-screwdown device, because the diameter of the shaft 7 must be dimensioned only with regard to the torque necessary for adjusting the lower chock 2.

The outer screw member 5 is supported by way of a buffer disc 8 serving as safety member, on a spherically constructed counter-surface of a pressure member 9 of the chock 2. This spherical counter-surface permits the chock to rock in the case of roll bending. Additionally a pressure bearing may be disposed below the buffer disc 8 when, in the case of heavy mills, the torque necessary for rotating the rotary member 5 becomes too large because of the friction then occurring at the counter-surface of the pressure member 9.

In FIG. 1 one half of the screwdown cup or variable length spacer member is illustrated in elevation. There may be seen a scale 3a for reading off the relative position of the screwdown cup 3 relative to the transverse frame member 1.

As may be clear from FIG. 1 in conjunction with FIG. 2, the shaft 7 is driven by a worm wheel 10 and a worm 12. A worm shaft 12a has a square section end 13 for attaching a tool thereto. Opposite to the worm shaft 12 a continuous shaft 14 with a square section end 15 is mounted on the other side of the worm wheel 10 and extends to the screwdown drive of the other frame of the mill so that the two screwdown cups of the rolling mill can be actuated from the same side of the latter.

Because of the small diameter of the opening 1a the invention permits the frames of a rolling mill, or—in the case of frameless rolling mills—the lower frame parts, to be produced by machining from a slab, instead of their production from cast steel, because the thickness of the frames can be kept small, owing to the omission of pressure nuts having a large diameter. The screwdown device according to the invention is particularly suitable for screwing down the lower chocks in tie rod frames in which the upper chocks are unitary with an immobile stand cap. Due to the fact that the outer screw member 5 having the internal screw-thread 5a engages over the inner member 4, the screw-thread connection between these two screw members is well protected against spray water and scale.

What is claimed is:

1. In a screwdown device for a rolling mill having a frame means, a window in said frame means, a transverse frame member defining said window, and a chock means displaceable in said window for screwdown movement, the improvement comprising an inner screw member having an external screw-thread thereon, an outer screw member having an internal screw-thread therein and mounted in meshing engagement with said inner screw member, said screw members being supportingly disposed between said chock means and said transverse frame member, said inner screw member being non-rotatable, said outer screw member being arranged for rotary movement, an opening extending through said transverse frame member, a shaft means extending through said opening, one end of said shaft means securely attached to said outer screw member, and the other end of said shaft means being adapted for rotary movement whereby mutually relative displacement of said screw members is effected so as to perform said screwdown movement.

2. A screwdown device for a rolling mill comprising a frame means, a window in said frame means, a transverse frame member defining said window, an opening extending through said transverse frame member, a chock means displacable in said window, a spacer member of variable length disposed externally of said transverse frame member and between said chock and said transverse frame member, said spacer member having an inner screw member with an external screw-thread and an outer screw member with an internal screw-thread, said inner screw member being non-rotatably fixed, said outer screw member being rotatable, said device further comprising a shaft which extends through said opening in said transverse frame member to drive said rotatable member to effect displacement of said chock means.

3. A screwdown device according to claim 2, wherein a pressure bearing is disposed between said outer screw member and said chock means.

* * * * *